United States Patent
Koshiyama

(10) Patent No.: US 10,459,637 B2
(45) Date of Patent: Oct. 29, 2019

(54) STORAGE DEVICE AND INFORMATION PROCESSOR

(71) Applicant: FUJITSU LIMITED, Kawasaki-shi, Kanagawa (JP)

(72) Inventor: Yuichi Koshiyama, Kahoku (JP)

(73) Assignee: FUJITSU LIMITED, Kawasaki (JP)

(*) Notice: Subject to any disclaimer, the term of this patent is extended or adjusted under 35 U.S.C. 154(b) by 105 days.

(21) Appl. No.: 15/903,081

(22) Filed: Feb. 23, 2018

(65) Prior Publication Data

US 2018/0284983 A1 Oct. 4, 2018

(30) Foreign Application Priority Data

Mar. 29, 2017 (JP) .................. 2017-066076

(51) Int. Cl.
| | | |
|---|---|---|
| G06F 3/00 | (2006.01) | |
| G06F 3/06 | (2006.01) | |
| G06F 9/30 | (2018.01) | |

(52) U.S. Cl.
CPC .......... G06F 3/061 (2013.01); G06F 3/0629 (2013.01); G06F 3/0659 (2013.01); G06F 3/0683 (2013.01); G06F 9/3005 (2013.01)

(58) Field of Classification Search
None
See application file for complete search history.

(56) References Cited

U.S. PATENT DOCUMENTS

| | | | |
|---|---|---|---|
| 6,977,895 B1* | 12/2005 | Shi ................. | H04L 47/521 370/235 |
| 7,020,564 B2* | 3/2006 | Tomita ............... | G06F 3/0605 386/265 |
| 7,564,810 B2* | 7/2009 | Hernandez ....... | H04W 52/0232 370/311 |
| 9,603,146 B1* | 3/2017 | Vivanco ........... | H04W 72/0453 |
| 9,622,114 B2* | 4/2017 | Park ................. | H04W 28/08 |
| 2007/0220028 A1* | 9/2007 | Hikawa ............. | G06F 9/505 |
| 2007/0220195 A1 | 9/2007 | Kawaguchi | |

FOREIGN PATENT DOCUMENTS

| | | |
|---|---|---|
| JP | 9-218858 | 8/1997 |
| JP | 2007-249468 | 9/2007 |
| JP | 2007-257028 | 10/2007 |

* cited by examiner

*Primary Examiner* — Cheng Yuan Tseng
(74) *Attorney, Agent, or Firm* — Fujitsu Patent Center

(57) ABSTRACT

A storage device stores data and is used by a plurality of information processors. The storage device receives prediction data which each of the plurality of information processors has predicted and transmitted, where the prediction data includes data regarding a data flow rate of each interface port with each of the plurality of information processors. The storage device calculates an access prediction value of each interface port based on the prediction data received from the plurality of information processors, and changes a setting of a process of each interface port based on the access prediction value.

15 Claims, 20 Drawing Sheets

FIG. 2

| CA PORT_A | | | | | |
|---|---|---|---|---|---|
| DATE | TIME ZONE | NUMBER OF Read ACCESSES | Read TRANSFER DATA SIZE | NUMBER OF Write ACCESSES | Write TRANSFER DATA SIZE |
| ... | ... | ... | ... | ... | ... |
| AUGUST 2 | 9:00 TO 9:59 | 200,000 TIMES | 30 GB | 300,000 TIMES | 40 GB |
| AUGUST 2 | 10:00 TO 10:59 | 400,000 TIMES | 50 GB | 550,000 TIMES | 75 GB |
| AUGUST 2 | 11:00 TO 11:59 | 250,000 TIMES | 45 GB | 400,000 TIMES | 65 GB |
| ... | ... | ... | ... | ... | ... |
| AUGUST 2 | 19:00 TO 19:59 | 100,000 TIMES | 10 GB | 150,000 TIMES | 20 GB |
| AUGUST 2 | 20:00 TO 20:59 | 50,000 TIMES | 8 GB | 100,000 TIMES | 10 GB |
| AUGUST 2 | 23:00 TO 23:59 | 50,000 TIMES | 8 GB | 100,000 TIMES | 10 GB |
| AUGUST 3 | 0:00 TO 0:59 | 100,000 TIMES | 10 GB | 100,000 TIMES | 10 GB |
| ... | ... | ... | ... | ... | ... |

FIG. 3

| CA PORT_A | | | | | |
|---|---|---|---|---|---|
| DAY | TIME ZONE | NUMBER OF Read ACCESSES | Read TRANSFER DATA SIZE | NUMBER OF Write ACCESSES | Write TRANSFER DATA SIZE |
| SUNDAY | 0:00 TO 0:59 | ... | ... | ... | ... |
| SUNDAY | 1:00 TO 1:59 | 20,000 TIMES | 20 GB | 30,000 TIMES | 40 GB |
| SUNDAY | 2:00 TO 2:59 | 30,000 TIMES | 25 GB | 35,000 TIMES | 75 GB |
| ... | ... | ... | ... | ... | ... |
| SUNDAY | 23:00 TO 23:59 | 60,000 TIMES | 50 GB | 65,000 TIMES | 55 GB |
| MONDAY | 0:00 TO 0:59 | 55,000 TIMES | 50 GB | 65,000 TIMES | 60 GB |
| MONDAY | 1:00 TO 1:59 | 60,000 TIMES | 55 GB | 60,000 TIMES | 55 GB |
| ... | ... | ... | ... | ... | ... |
| SATURDAY | 22:00 TO 22:59 | 40,000 TIMES | 35 GB | 55,000 TIMES | 10 GB |
| SATURDAY | 23:00 TO 23:59 | 45,000 TIMES | 45 GB | 50,000 TIMES | 10 GB |

FIG. 4

| CA PORT_A | SERVER_A | | | | |
|---|---|---|---|---|---|
| DAY | TIME ZONE | NUMBER OF Read ACCESSES | Read TRANSFER DATA SIZE | NUMBER OF Write ACCESSES | Write TRANSFER DATA SIZE |
| SUNDAY | 0:00 TO 0:59 | ... | ... | ... | ... |
| SUNDAY | 1:00 TO 1:59 | 20,000 TIMES | 20 GB | 30,000 TIMES | 40 GB |
| SUNDAY | 2:00 TO 2:59 | 30,000 TIMES | 25 GB | 35,000 TIMES | 75 GB |
| ... | ... | ... | ... | ... | ... |
| SUNDAY | 23:00 TO 23:59 | 60,000 TIMES | 50 GB | 65,000 TIMES | 55 GB |
| MONDAY | 0:00 TO 0:59 | 55,000 TIMES | 50 GB | 65,000 TIMES | 60 GB |
| MONDAY | 1:00 TO 1:59 | 60,000 TIMES | 55 GB | 60,000 TIMES | 55 GB |
| ... | ... | ... | ... | ... | ... |
| SATURDAY | 22:00 TO 22:59 | 40,000 TIMES | 35 GB | 55,000 TIMES | 10 GB |
| SATURDAY | 23:00 TO 23:59 | 45,000 TIMES | 45 GB | 50,000 TIMES | 10 GB |

STORAGE DEVICE AND INFORMATION PROCESSOR

CROSS-REFERENCE TO RELATED APPLICATION

This application is based upon and claims the benefit of priority of the prior Japanese Patent Application No. 2017-66076, filed on Mar. 29, 2017, the entire contents of which are incorporated herein by reference.

FIELD

The embodiment discussed herein is related to a storage device and an information processor.

BACKGROUND

When a server performs an input/output (IO) access to a storage device which stores data to be used, the server accesses the storage device through an access path via an interface on the side of the server and an interface on the side of the storage device. The access path between the server and the storage device often becomes redundant, and the multipass driver running on the server selects an access path and the server accesses the storage device through the selected access path.

FIG. 18 illustrates an example IO access from a server to a storage device. As illustrated in FIG. 18, a user application 20 which runs on a server 92 (represented by a server X, a server Y, and a server Z) requests an IO access to a multipass driver 921.

The multipass driver 921 selects an access path through a host bus adapter (HBA) 22 on the side of the server 92 and a channel adapter (CA) port 30 on the side of a storage device 93. In FIG. 18, the multipass driver 921 which runs on the server X selects either of an access path through the CA port 30 represented by the HBA 22 and a CA port A or an access path through the CA port 30 represented by another HBA 22 and a CA port B. The multipass driver 921 selects an access path such that access performance is optimized.

In the IO access to the storage device 93 from the server 92, an access flow rate requested by the server 92 is dependent on the following two factors: (1) Characteristics of the user application 20 which runs on the server 92; and
(2) Role of the Server 92.

Here, the access flow rate is an amount of data to be transferred during the IO access.

Examples of (1) may include an operation time period (a work time period, a midnight backup) of the user application 20, and a ratio between Read and Write operations of the user application 20. Examples of (2) may include a main operating server, a sub operating server, and a standby server.

FIGS. 19 and 20 illustrate example changes in access flow rates which are dependent on the role of the server 92. In FIGS. 19 and 20, the server X is a main operating server, the server Y is a sub operating server, and the server Z is a standby server. FIG. 19 illustrates an example change in an access flow rate of an operating application on Monday. Here, the operating application is an operating application which operates in an operating server and a standby system of an operating server. In FIG. 19, time is plotted on the horizontal axis and the access flow rate is plotted on the vertical axis. As illustrated in FIG. 19, a temporal change in the access flow rate in one day varies depending on the role of the server 92.

FIG. 20 illustrates example statistics of the access flow rate of the operating application for each day of the week. In FIG. 20, the day of the week is plotted on the horizontal axis and the access flow rate is plotted on the vertical axis. As illustrated in FIG. 20, depending on the role of the server 92, the access flow rate for each day of the week varies.

Access performance in each access path is dependent on the following two factors of the storage device 93:
(3) number of steps in an internal process in each CA port 30; and
(4) central processing unit (CPU) power to be allocated to each CA port 30.

The factor (3) is the number of steps of the IO process by a controller module (CM: a control device of the storage device 93) after the storage device 93 receives an access until the storage device 93 responds to the server 92, and (3) is dependent on the CA port 30. FIG. 21 illustrates an example difference in the number of steps in the internal process among the CA ports 30. As illustrated in FIG. 21, examples of the IO process of each CA port 30 may include an IO receiving process of receiving an IO access, a data transfer process of transferring data to the storage unit 32, and an IO respond process of responding to the IO access.

The number of process steps in the IO processes in the CA port A and the CA port C is larger than those in the CA port B and the CA port D by a notification process. Here, the "notification process" refers to a process for notifying that a CA port 30 in a non-responsive CM has performed an IO process to a CA port 30 in a responsive CM. In FIG. 21, the CA port A and the CA port C are the CA ports in a non-responsive CM, and the CA port B and the CA port D are the CA ports in a responsive CM. The responsive CM is the CM which takes charge of control of the storage unit 32. The number of steps in the internal process may vary for each CA port in examples other than that illustrated in FIG. 21.

Regarding (4), FIG. 22 illustrates example allocation of CPU power to each CA port 30. In FIG. 22, 20% of the CPU power is allocated to the IO processes of the CA port A and the CA port B, 15% of the CPU power is allocated to the IO processes of the CA port C and the CA port D, and 30% of the CPU power is allocated to other processes.

In order to set the processing time of the user application 20 on the server 92 to be the shortest, it is desired to adjust (3) and (4) in accordance with (1) and (2). However, the server 92 does not have a function to transmit (1) and (2) to the storage device 93, and the storage device 93 is not able to adjust (3) and (4) in accordance with (1) and (2).

Therefore, the multipass driver 921 acquires information on (3) and (4) from the storage device 93 and, when selecting an access path, preferentially selects an access path to a CA port 30 with a smaller number of steps of the internal process using the acquired information on (3). The multipass driver 921 obtains the CPU power allocated to the CA port 30 using the acquired information on (4) and temporarily holds, in the multipass driver 921, the IO access that is not able to be processed, thereby limiting an access flow rate from the server 92.

There has been proposed a technology, in a distributed database management system in which data is distributed in a plurality of processors, to detect an imbalance in process load of each processor, obtain a data distribution configuration which can equalize the imbalance, and perform a change process of the data distribution configuration at predetermined timing. According to this technology, the process load in each processor can be easily equalized.

Further, there has been proposed a technology to detect a loading state of memory by a tracing function of obtaining access statistics so that imbalance/competition of memory access issued by each processor can be discriminated, and implement a load distribution of the memory access by replacing memory spaces.

Further, there has been proposed a technology to acquire, for each database server, a data usage indicating data capacitance which is a target of an access process, calculate a ratio of a CPU allotment based on a ratio of the data usage for each database server, and change CPU resource allocation to the database server. According to this technology, a decrease in processing performance of a database management system can be reduced, and an imbalance in the processing performance can be corrected.

Japanese Laid-open Patent Publication No. 9-218858, Japanese Laid-open Patent Publication No. 2007-257028, Japanese Laid-open Patent Publication No. 2007-249468 are examples of the related art.

SUMMARY

According to an aspect of the invention, a storage device stores data and is used by a plurality of information processors. The storage device receives prediction data which each of the plurality of information processors has predicted and transmitted, where the prediction data includes data regarding a data flow rate of each interface port with each of the plurality of information processors. The storage device calculates an access prediction value of each interface port based on the prediction data received from the plurality of information processors, and changes a setting of a process of each interface port based on the access prediction value.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 illustrates example flow rate data;

FIG. 3 illustrates example prediction data generated by a prediction data generation unit;

FIG. 4 illustrates example prediction data stored by the prediction data storage unit of a storage device;

DESCRIPTION OF EMBODIMENT

Figure 18:
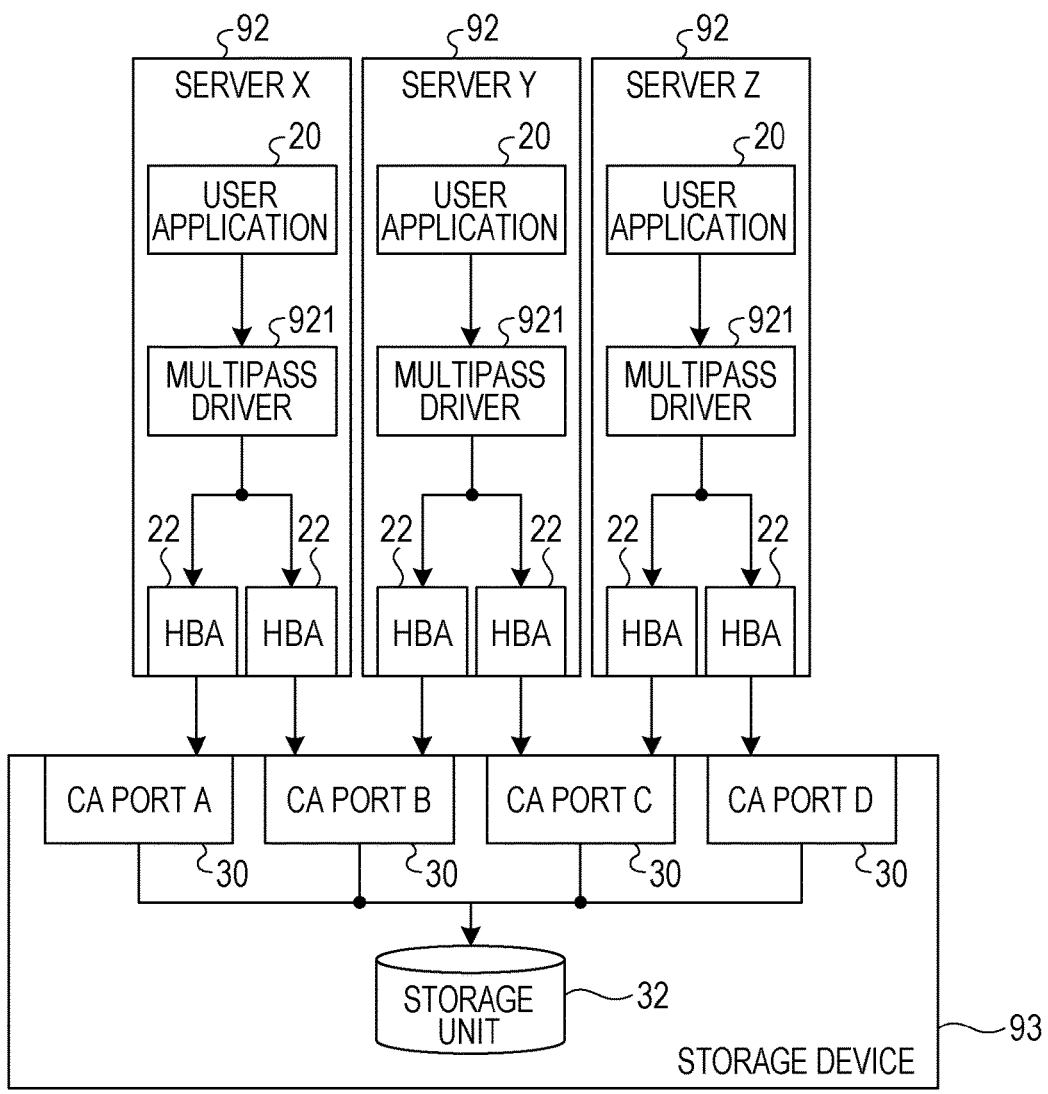
FIG. 18 illustrates an example IO access from a server to a storage device.
Figure 19:
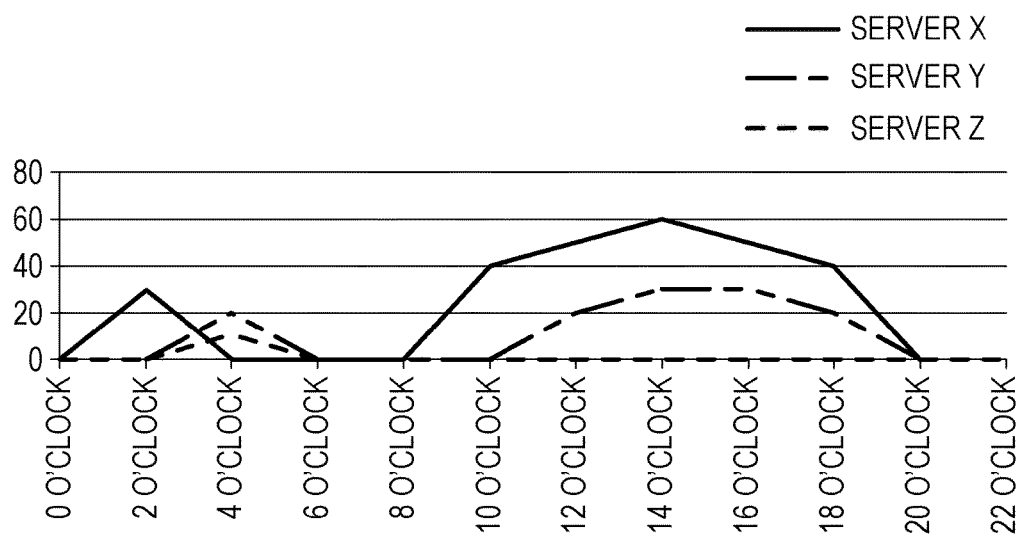
FIG. 19 illustrates an example change of an access flow rate of an operating application on Monday.
Figure 20:
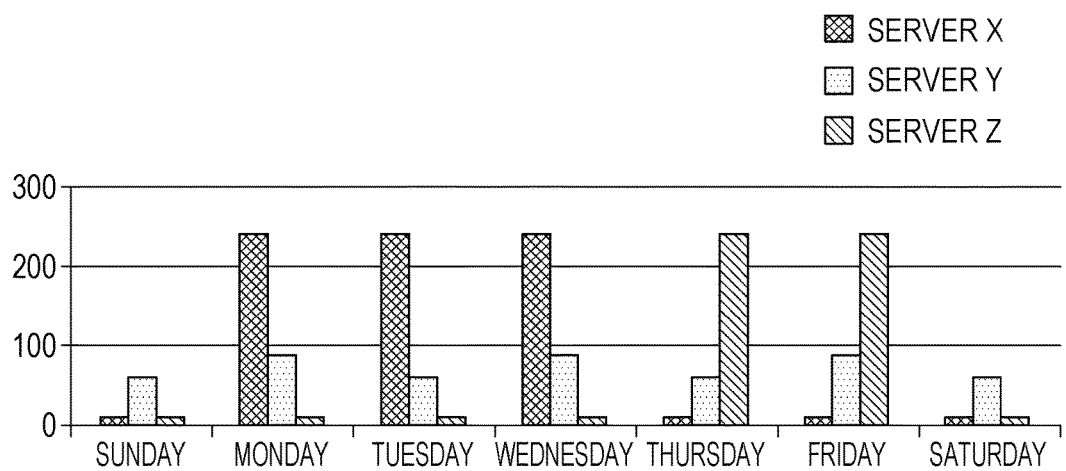
FIG. 20 illustrates example statistics of an access flow rate of an operating application for each day of the week.
Figure 21:
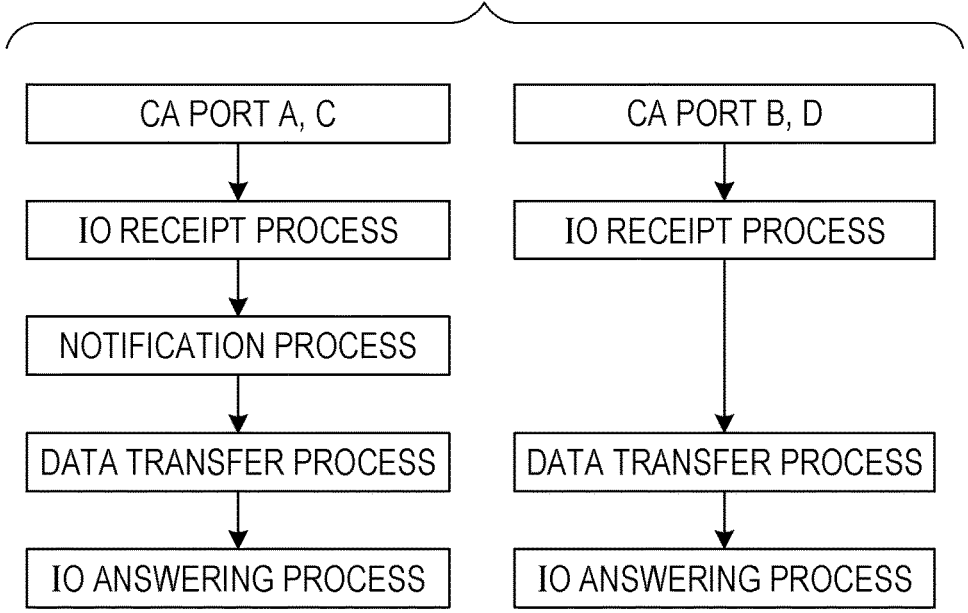
FIG. 21 illustrates an example difference in the number of steps in an internal process among CA ports.
Figure 22:
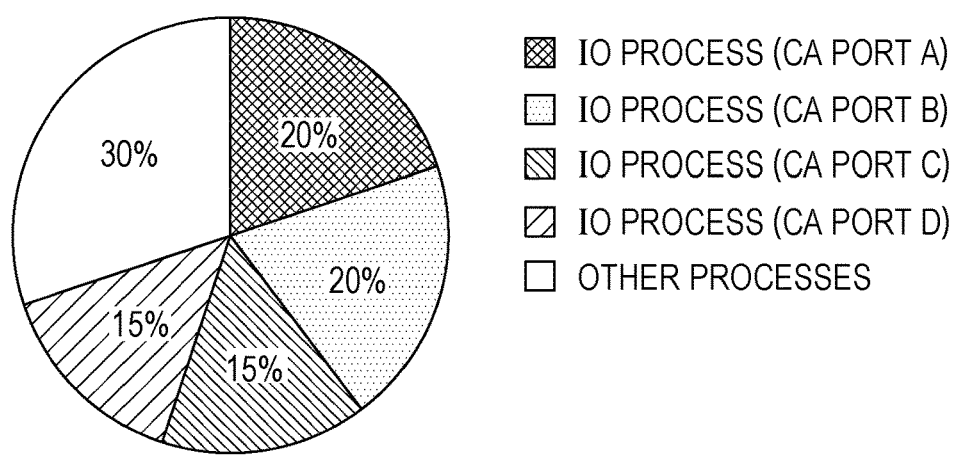
FIG. 22 illustrates example allocation of CPU power to each CA port.

The multipass driver 921 illustrated in FIG. 18 selects an access path based on the number of steps in the internal process of each CA port 30, and limits an access flow rate based on a ratio of the CPU power allocated to each CA port 30. However, the access path selection and the access flow rate limitation described above may have an issue that access performance as a whole system illustrated in FIG. 18 is not able to be equalized.

Figure 23:
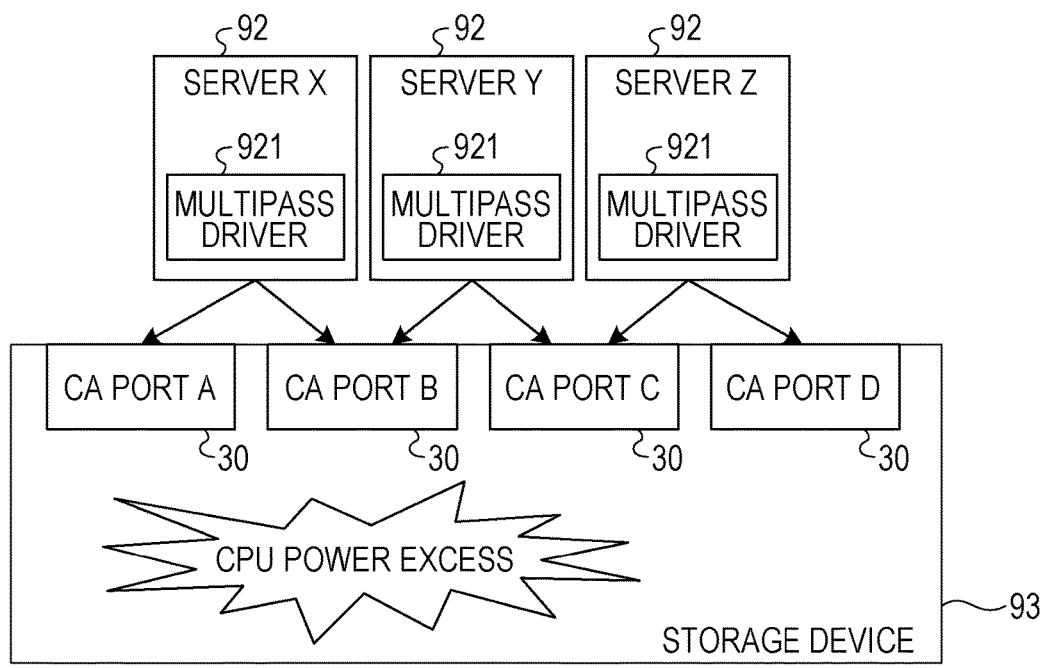
FIG. 23 illustrates an issue of the related art.

FIG. 23 illustrates the issue of the related art. As illustrated in FIG. 23, the multipass drivers 921 of the server X and the server Y simultaneously request an IO access to the CA port B based on a ratio of the CPU power allocated to each CA port 30 at the access flow rate up to the limit of the access flow rate. Then, the CPU power desired for the IO process of the CA port B will exceed the CPU power allocated to the CA port B, and retransmission of the IO access will be desired.

It is preferable to equalize IO performance of a plurality of CA ports to be accessed by a plurality of servers.

Hereinafter, the embodiment of a storage device, an information processor, and a driver program disclosed by the present application will be described in detail with reference to the drawings. The embodiments do not limit the disclosed techniques.

Example

Figure 1:
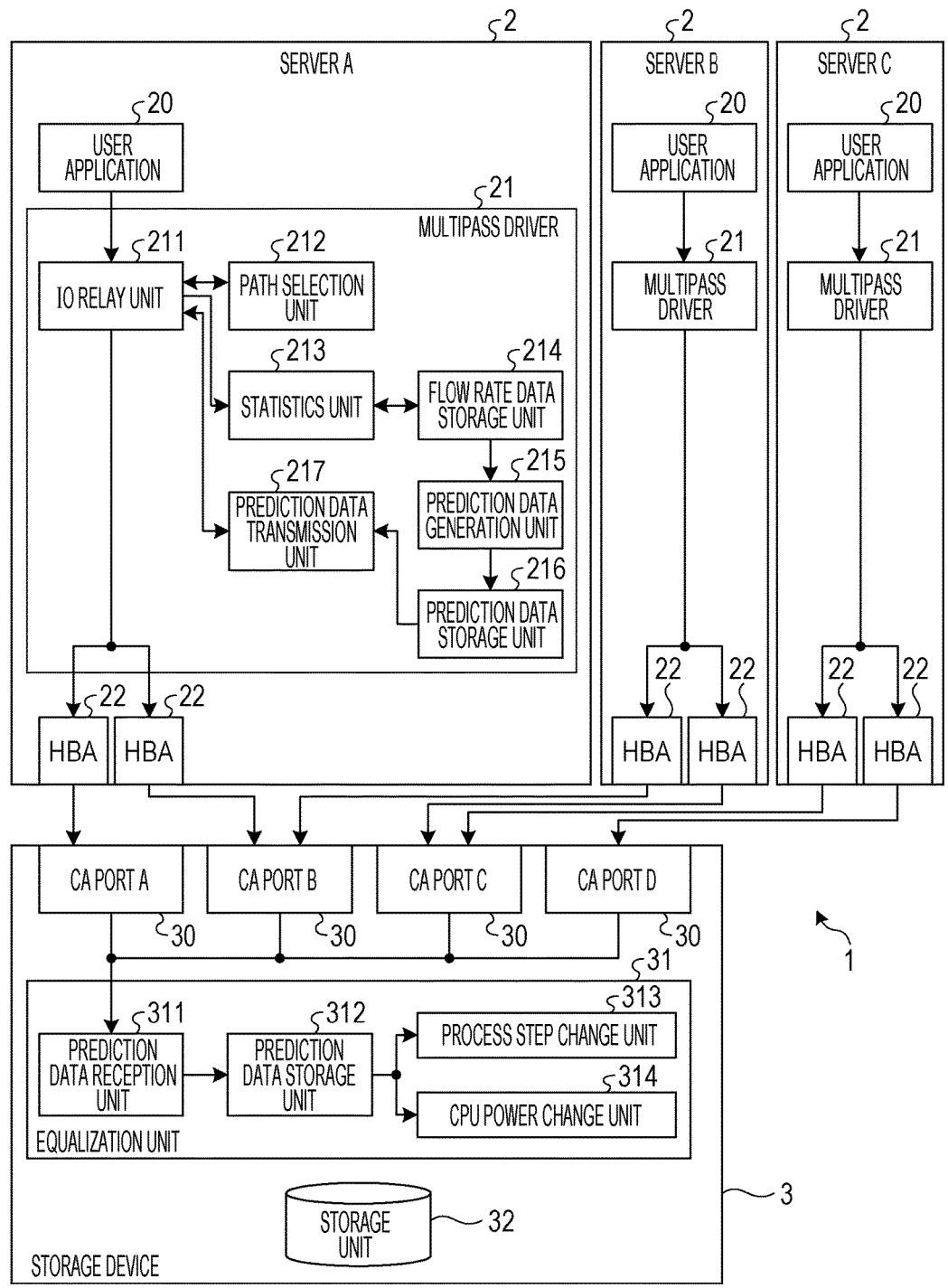
FIG. 1 illustrates a configuration of an information processing system according to an embodiment.

First, a configuration of an information processing system according to an embodiment will be described. FIG. 1 illustrates a configuration of an information processing system according to an embodiment. As illustrated in FIG. 1, an information processing system 1 according to the embodiment includes three servers 2 represented by a server A, a server B, and a server C and a storage device 3 which includes four CA ports 30 represented by a CA port A, a CA port B, a CA port C, and a CA port D. The servers 2 process information. The storage device 3 includes a non-transitory storage unit 32 which stores data to be used by the servers 2.

Here, three servers 2 are described for the convenience of description, however, the information processing system 1 may include two, or four or more servers 2. The storage device 3 may include two, three, or five or more CA ports 30.

A user application 20 and a multipass driver 21 run on the servers 2. The user application 20 is a user application, such as an operation application. Each of the servers 2 includes a HBA 22. The HBA 22 is an interface with the storage device 3. The CA port 30 is an interface with the servers 2.

The multipass driver 21 includes an IO relay unit 211, a path selection unit 212, a statistics unit 213, a flow rate data storage unit 214, a prediction data generation unit 215, a prediction data storage unit 216, and a prediction data transmission unit 217.

The IO relay unit 211 relays an IO access request from the user application 20 to the storage device 3. The IO relay unit 211 delivers, to the HBA 22, an IO request to the storage device 3 from the user application 20 based on the access path selected by the path selection unit 212. The path selection unit 212 selects an access path such that the use of each access path is distributed.

The IO relay unit 211 delivers information on the relayed IO access request to the statistics unit 213 as access information. The access information includes information on the CA port 30 of access destination, an access date, a transfer data size, and information whether the access is a Read access or a Write access.

The statistics unit 213 statistically processes the access information, generates flow rate data, and stores the generated flow rate data in the flow rate data storage unit 214. The flow rate data storage unit 214 stores the flow rate data. FIG. 2 illustrates example flow rate data. As illustrated in FIG. 2, the flow rate data includes a CA port name, a date, a time period, the number of Read accesses, a Read transfer data size, the number of Write accesses, and a Write transfer data size.

The CA port name is a name of the CA port 30, indicating that the flow rate data is data related to which CA port 30. FIG. 2 illustrates flow rate data related to the CA port A. The date is Month and Day on which the IO access to the storage device 3 is performed. The time period is a time period in which the IO access to the storage device 3 is performed. In FIG. 2, the IO access to the storage device 3 is totaled hourly.

The number of Read accesses is the number of times of Read accesses to the storage device 3. The Read transfer data size is the size of data transferred to the servers 2 from the storage device 3 by the Read access. The number of Write accesses is the number of times of the Write accesses to the storage device 3. The Write transfer data size is the size of data transferred to the storage device 3 from the servers 2 by the Write access.

For example, regarding the CA port A, from 9:00 to 9:59 on August 2, 200,000 times of Read accesses are performed and data of 30 GB (G byte) is transferred to the servers 2 from the storage device 3. In the same time period, 300,000 times of Write accesses are performed and data of 40 GB is transferred to the storage device 3 from the servers 2.

The prediction data generation unit 215 predicts a future flow rate using the flow rate data stored in the flow rate data storage unit 214, and generates prediction data. For example, the prediction data generation unit 215 calculates an average value of past flow rate data for each time period of the day of the week, and generates prediction data. The prediction data generation unit 215 generates prediction data for each CA port 30, and stores the generated prediction data in the prediction data storage unit 216. The prediction data storage unit 216 stores the prediction data generated by the prediction data generation unit 215.

FIG. 3 illustrates example prediction data generated by the prediction data generation unit 215. As illustrated in FIG. 3, the prediction data includes the CA port name, day of the week, the time period, the number of Read accesses, the Read transfer data size, the number of Write accesses, and the Write transfer data size.

The CA port name is a name of the CA port 30, indicating that the prediction data is data related to which CA port 30. FIG. 3 illustrates prediction data related to the CA port A. The day of the week is the day of the week on which the prediction is performed. The time period is the time period in which the prediction is performed. In FIG. 3, prediction is performed hourly.

The number of Read accesses is the number of times of Read access prediction times to the storage device 3. The read transfer data size is the prediction size of data transferred to the servers 2 from the storage device 3 by Read access. The number of Write accesses is the number of times of Write access prediction times to the storage device 3. The Write transfer data size is the prediction size of data transferred to the storage device 3 from the servers 2 by Write access.

For example, regarding the CA port A, it is predicted that 20,000 times of Read accesses is performed from 1:00 and 1:59 on Sunday, and that data of 20 GB is transferred to the servers 2 from the storage device 3. It is predicted that 300,000 times of Write accesses are performed in the same time period and that data of 40 GB is transferred to the storage device 3 from the servers 2.

The prediction data transmission unit 217 determines whether the prediction data is desired to be transmitted to the storage device 3 and, if the prediction data is desired to be transmitted to the storage device 3, adds the prediction data stored in the prediction data storage unit 216 to communication data of the IO relay unit 211, and delivers to the IO relay unit 211. Here, the communication data includes information on the access destination, discrimination between Read and Write, and data in the case of Write. The IO relay unit 211 transmits the prediction data to the storage device 3 together with the communication data.

Returning now to FIG. 1, an equalization unit 31 which equalizes IO performance of the CA port A to the CA port D operates in the storage device 3. The equalization unit 31 includes a prediction data receiving unit 311, a prediction data storage unit 312, a process step change unit 313, and a CPU power change unit 314.

The prediction data receiving unit 311 determines whether prediction data is included in the communication data transmitted from the servers 2. If prediction data is included, the prediction data receiving unit 311 stores the prediction data in the prediction data storage unit 312. The prediction data storage unit 312 stores prediction data extracted from the communication data by the prediction data receiving unit 311. The prediction data storage unit 312 stores prediction data transmitted from the server A, the server B, and the server C for each port and for each server.

FIG. 4 illustrates example prediction data stored in the prediction data storage unit 312. As illustrated in FIG. 4, prediction data stored by the prediction data storage unit 312 includes a CA port name, a server name, a day of the week, a time period, the number of Read accesses, a Read transfer data size, the number of Write accesses, and a Write transfer data size.

The CA port name is a name of the CA port 30, indicating that the prediction data is data related to which CA port 30. FIG. 4 illustrates prediction data related to the CA port A. The server name is names of the servers 2, indicating that the prediction data relates to which one of servers 2. FIG. 4 illustrates prediction data on the server A. The day of the week, the time period, the number of Read accesses, the Read transfer data size, the number of Write accesses, and the Write transfer data size are the same as those illustrated in FIG. 3.

For example, regarding the CA port A, it is predicted that 20,000 times of Read accesses is performed from 1:00 and 1:59 on Sunday, and that data of 20 GB is transferred to the server A from the storage device 3. It is predicted that 300,000 times of Write accesses are performed in the same time period and that data of 40 GB is transferred to the storage device 3 from the server A.

The process step change unit 313 compares a predicted number of accesses to each CA port 30 using the prediction data stored by the prediction data storage unit 312. Here, the predicted number of accesses is a summed value of the number of Read accesses and the number of Write accesses of the prediction data transmitted from the server A, the server B, and the server C.

The process step change unit 313 changes setting of the internal process of the CA port 30 such that a process with a greater number of steps in the internal process may be performed with respect to a CA port 30 with the smaller number of predicted accesses. For example, if the number of predicted accesses of the CA port A and the CA port C are smaller than the number of predicted accesses of the CA port B and the CA port D, the process step change unit 313 changes setting such that a process with a greater number of steps in the internal process may be performed in the CA port A and the CA port C.

For example, if there are two CA ports 30 in two CMs (control devices of the storage device 3), respectively, the process step change unit 313 calculates the sum of the predicted number of accesses of the two CA ports 30 in the same CM. Then the process step change unit 313 changes setting such that a notification process may be performed with the CM with a smaller total value as a non-responsive CM.

The CPU power change unit 314 changes allocation of the CPU power to each CA port 30 based on the predicted access flow rate to each CA port 30. Here, the predicted access flow rate is a sum value of the Read transfer data size of the prediction data transmitted from server A, server B, and server C and the Write transfer data size.

For example, the CPU power change unit 314 adjusts the CPU allocation to each current CA port 30 based on the predicted access flow rate. Alternatively, the CPU power change unit 314 changes allocation of the CPU power to each CA port 30 such that the ratio becomes the same as the ratio of the predicted access flow rate.

If there are two or more CMs and there is a CPU in each CM, the CPU in each CM performs the IO process of the CA port 30 in the CM. Therefore, the CPU power change unit 314 associates the CPU power to each CA port 30 such that the sum of the CPU power allocated to the IO process of the CA port 30 in the CM and other processes becomes 100%. If two or more CMs exist and there is a CPU in each CM, any of the CMs has the equalization unit 31.

Figure 5:
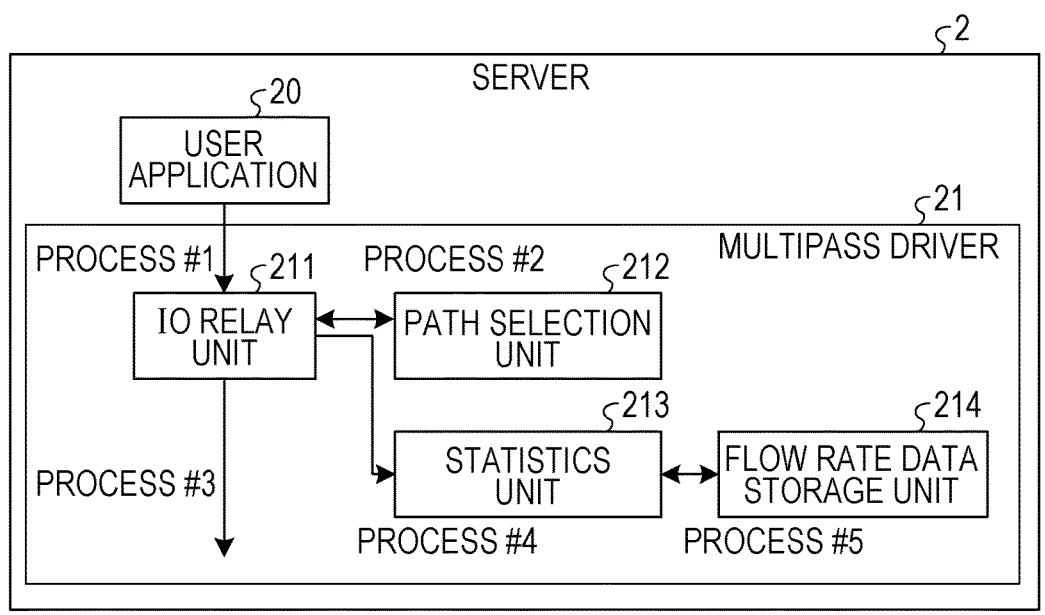
FIG. 5 illustrates a process flow of IO access control and flow rate data generation by a server.

Next, a process flow of IO access control and flow rate data generation by the servers 2 will be described. FIG. 5 illustrates a process flow of IO access control and flow rate data generation by the servers 2, and FIG. 6 is a flowchart illustrating a process flow of IO access control and flow rate data generation by the servers 2.

As illustrated in FIG. 5, the user application 20 requests an IO access to the multipass driver 21 (process #1). Then, the IO relay unit 211 makes an inquiry to the path selection unit 212, the path selection unit 212 selects an access path, and notifies the selected access path to the IO relay unit 211 (process #2).

The IO relay unit 211 accesses the storage device 3 using the notified access path (process #3). The IO relay unit 211 notifies access information to the statistics unit 213 (process #4). The statistics unit 213 performs a statistical process of the access information, generates flow rate data, and stores the generated data in the flow rate data storage unit 214 (process #5).

Figure 6:
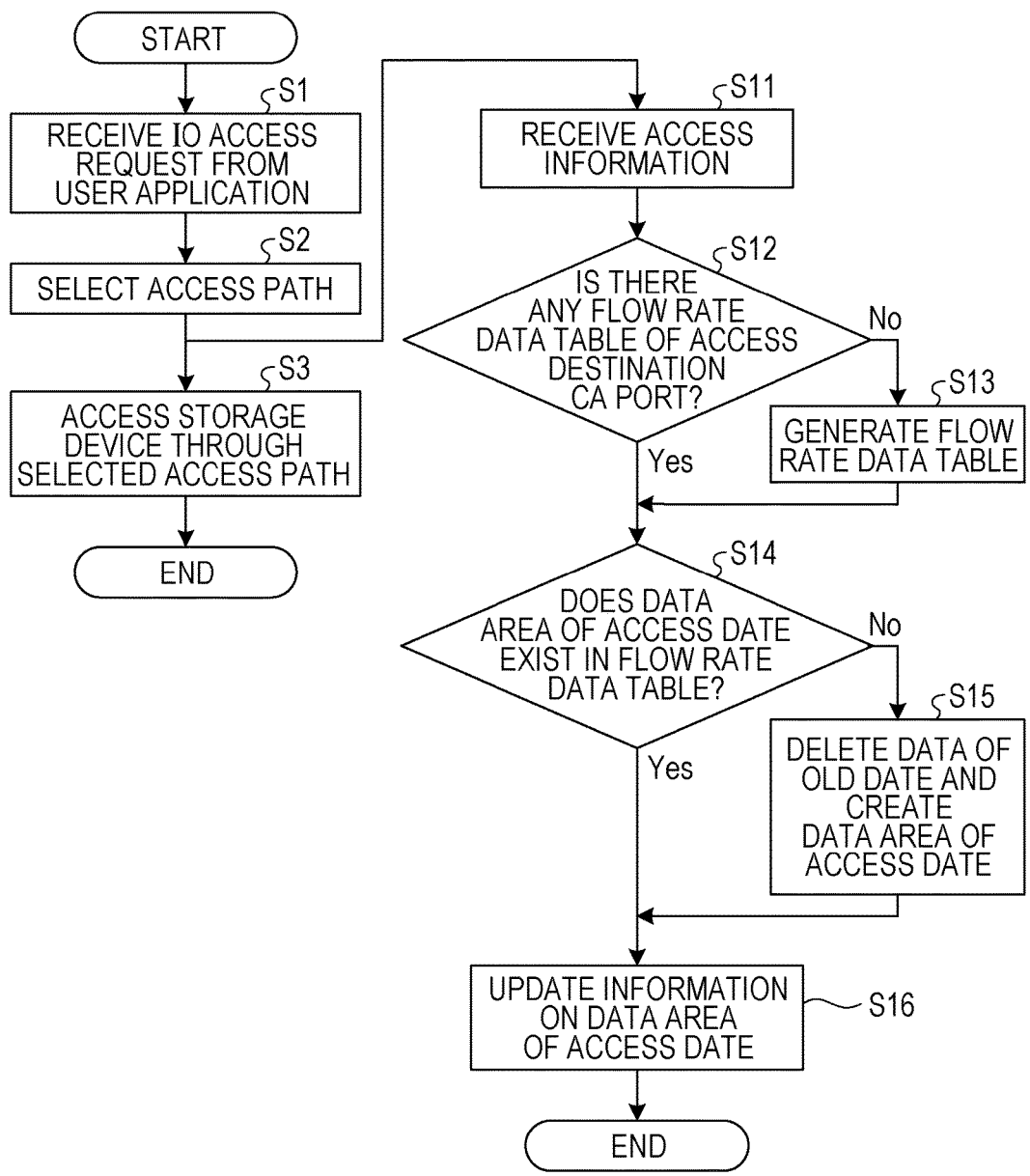
FIG. 6 is a flowchart illustrating a process flow of IO access control and flow rate data generation by the server.

As illustrated in FIG. 6, the multipass driver 21 receives an IO access request from the user application 20 (step S1), and selects an access path (step S2). The multipass driver 21 accesses the storage device 3 using the selected access path (step S3) and notifies the access information to a flow rate thread which generates flow rate data. Here, the flow rate thread corresponds to the statistics unit 213.

The flow rate thread receives access information (step S11) and determines whether a flow rate data table of the access destination CA port 30 exists (step S12). Here, the flow rate data table is a table in which flow rate data is registered. If no flow rate data table exists, the flow rate thread generates a flow rate data table (step S13).

The flow rate thread determines whether a data area of an access date exists in the flow rate data table (step S14). If no access data exists, the flow rate thread deletes a data area of previous date and generates a data area of the access date (step S15). The flow rate thread then updates information on the data area of the access date using the received access information (step S16).

As described above, the multipass driver 21 can predict the future flow rate data by generating the flow rate data based on the IO access.

Figure 7:
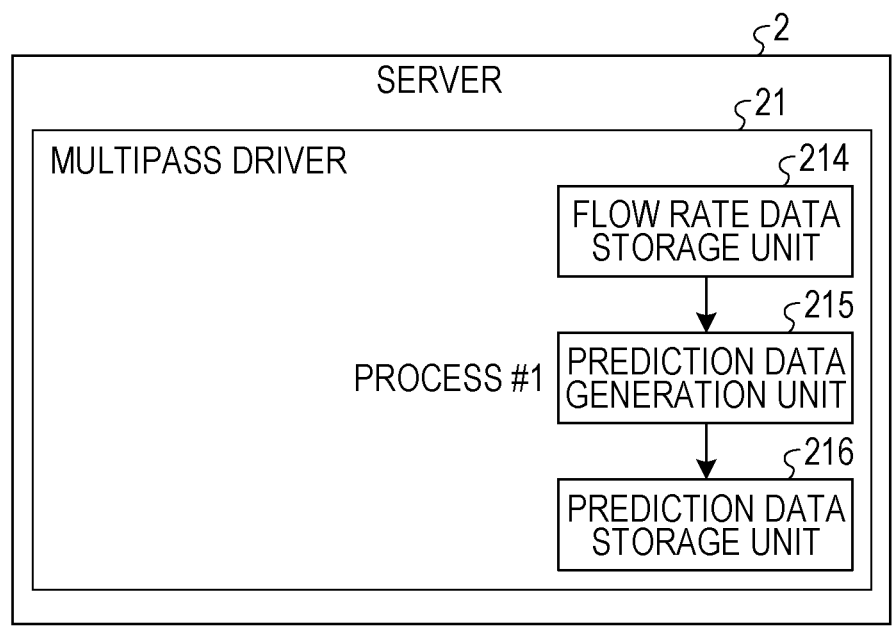
FIG. 7 illustrates a process flow of prediction data generation.

Next, a process flow of prediction data generation will be described. FIG. 7 illustrates a process flow of prediction data generation, and FIG. 8 is a flowchart illustrating a process flow of prediction data generation.

As illustrated in FIG. 7, prediction data generation unit 215 performs future prediction using flow rate data stored by flow rate data storage unit 214, generates prediction data, and stores them in prediction data storage unit 216 (process #1). The prediction data generation unit 215 generates prediction data at a certain time interval, such as 24 hours.

Figure 8:
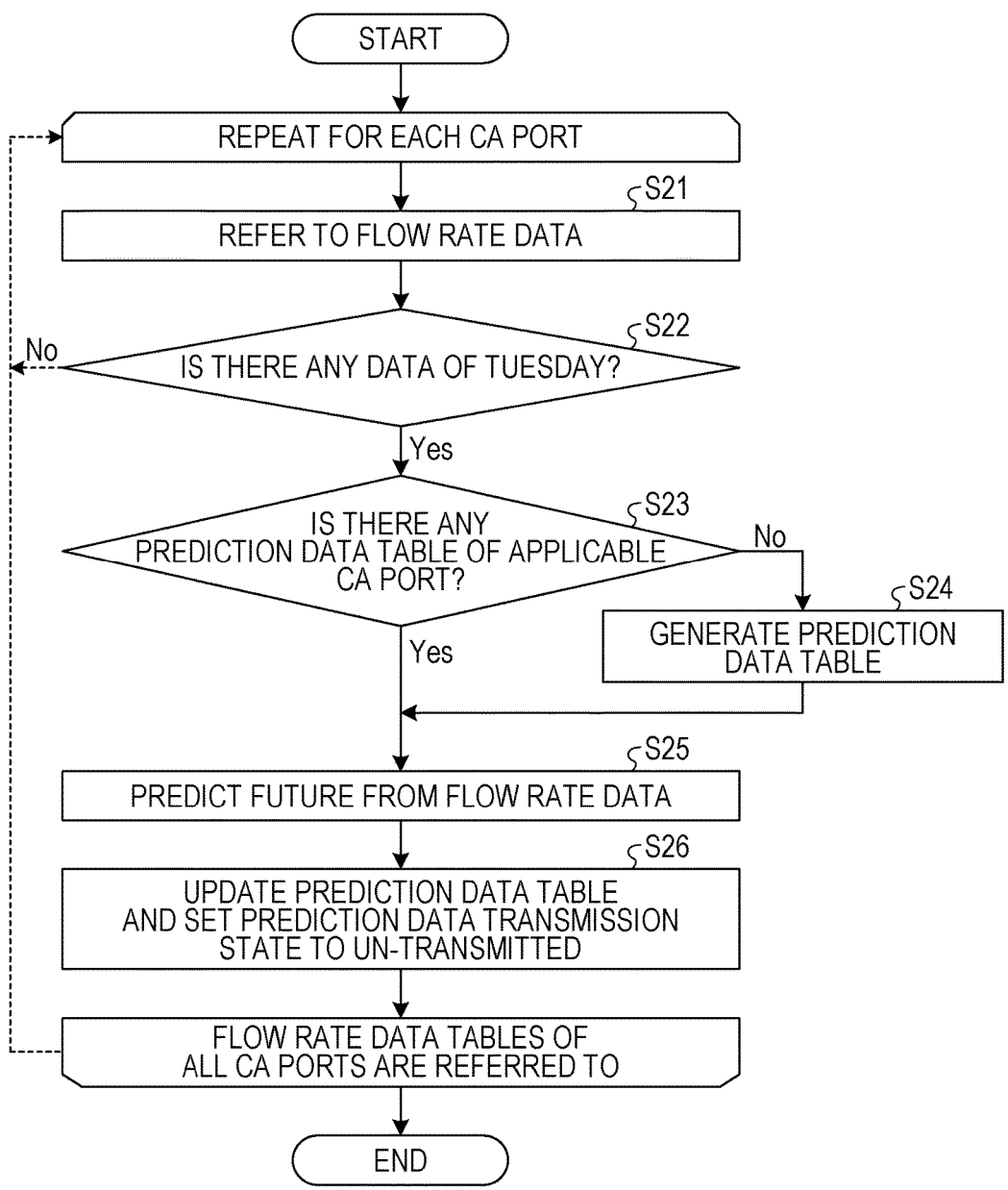
FIG. 8 is a flowchart illustrating a process flow of prediction data generation.

As illustrated in FIG. 8, the prediction data generation unit 215 processes steps S21 to S26 for each CA port 30. Although FIG. 8 illustrates a flowchart for generating prediction data on Tuesday, prediction data of other days of the week are generated similarly.

The prediction data generation unit 215 refers to the flow rate data (step S21) and determines whether data on Tuesday exists (step S22). If no data on Tuesday exists, the prediction data generation unit 215 returns to step S21, and performs processing for a subsequent CA port 30.

If data on Tuesday exists, the prediction data generation unit 215 determines whether a prediction data table of an applicable CA port 30 exists (step S23). Here, the prediction data table is a table in which prediction data is registered. If no prediction data table of the applicable CA port 30 exists, the prediction data generation unit 215 generates a prediction data table (step S24).

The prediction data generation unit 215 performs future prediction from the flow rate data (step S25). The prediction data generation unit 215 updates the prediction data table and sets a prediction data transmission state to be "un-transmitted" (step S26). When the flow rate data tables of all the CA port 30 are referred to, the prediction data generation unit 215 will terminate the process.

As described above, since the prediction data generation unit 215 generates prediction data using the flow rate data, the information processing system 1 can equalize the IO performance of the CA port 30 based on the prediction data.

Figure 9:
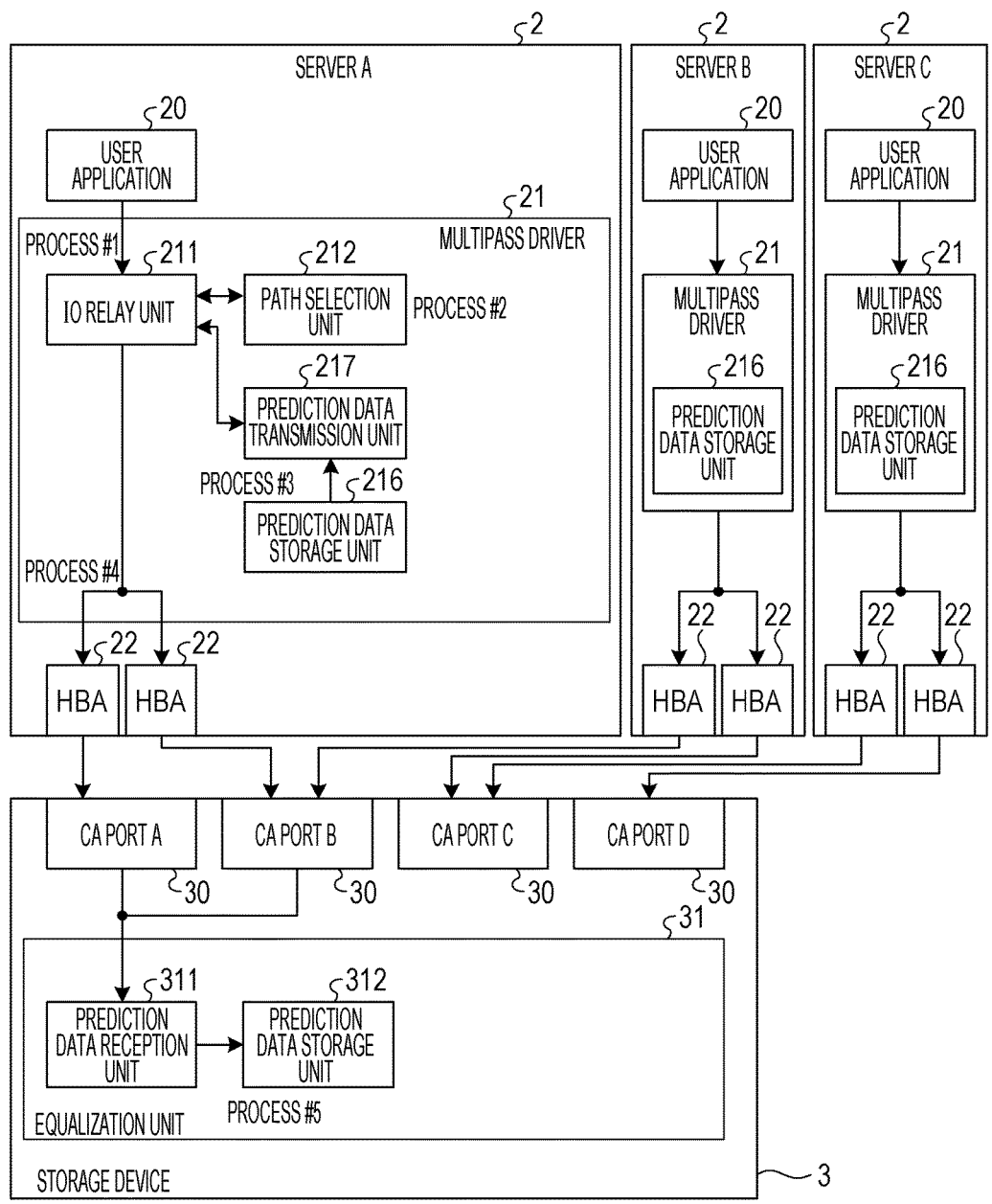
FIG. 9 illustrates a flow of a communication process of prediction data.
Figure 10:
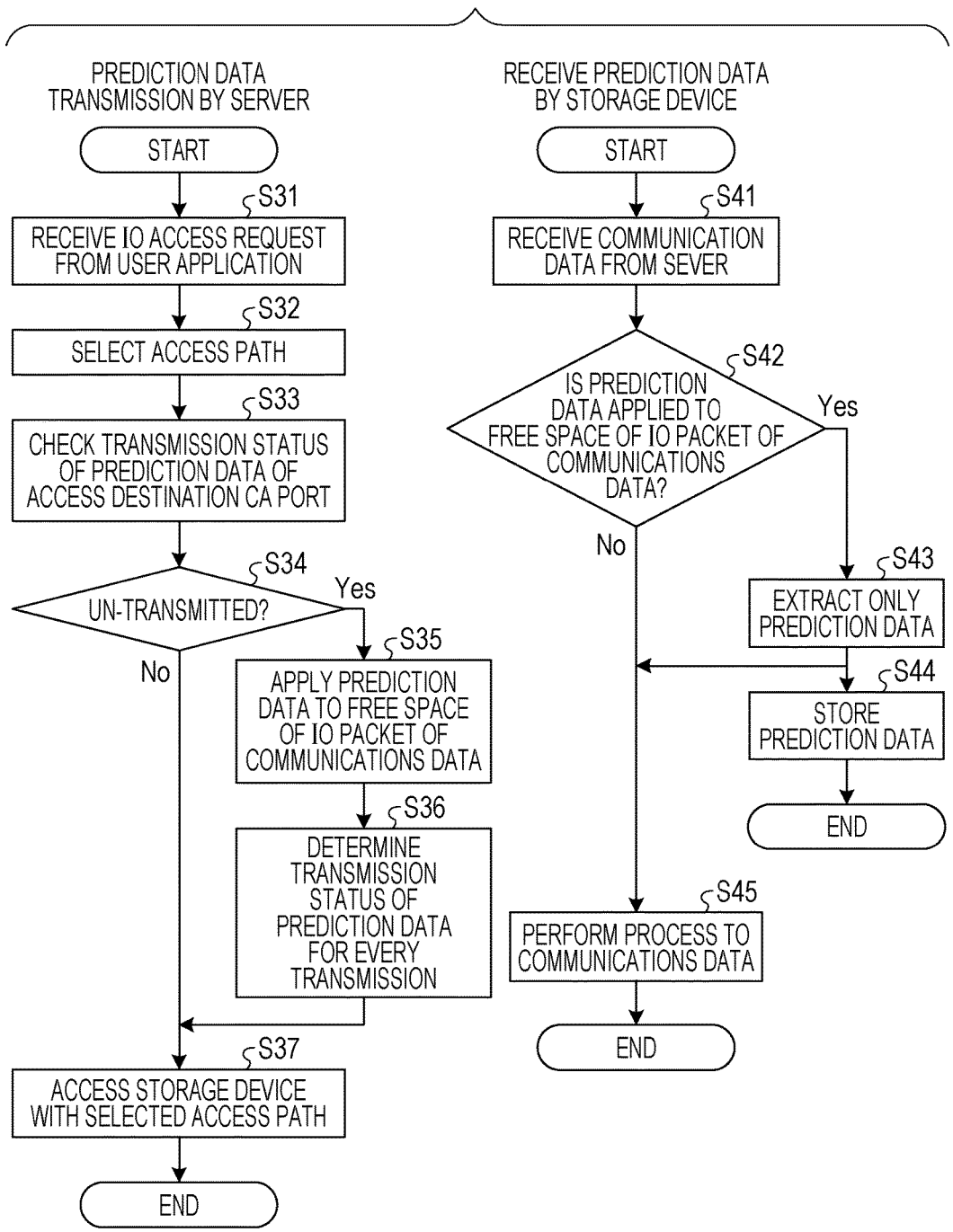
FIG. 10 is a flowchart illustrating a process flow of prediction data transmission and prediction data reception.

Next, a flow of a communication process of the prediction data will be described. FIG. 9 illustrates a flow of the communication process of the prediction data, and FIG. 10 is a flowchart illustrating a process flow of prediction data transmission and prediction data reception.

As illustrated in FIG. 9, the user application 20 requests an IO access to the multipass driver 21 (process #1). Then, the IO relay unit 211 makes an inquiry to the path selection unit 212, and the path selection unit 212 selects an access path, and notifies the selected access path to the IO relay unit 211 (process #2).

The IO relay unit 211 makes an inquiry to the prediction data transmission unit 217, and the prediction data transmission unit 217 determines necessity/unnecessity of transmission of the prediction data based on a prediction data transmission state. If transmission of the prediction data is desired, the prediction data transmission unit 217 acquires prediction data, and applies prediction data to the communication data to communicate by the IO access (process #3).

Then the IO relay unit 211 issues an IO access to the notified access path, and performs an IO access to the storage device 3 (process #4). The prediction data receiving unit 311 of the storage device 3 determines whether prediction data is included in the communication data. If prediction data is included, the received prediction data is stored in the prediction data storage unit 312 of the storage device 3 (process #5).

As illustrated in FIG. 10, the multipass driver 21 receives an IO access request from the user application 20 (step S31), and selects an access path (step S32). The multipass driver 21 then checks a transmission state of prediction data of the CA port 30 of the access destination (step S33), and determines whether the prediction data transmission state is "un-transmitted" (step S34).

If the prediction data transmission state is "un-transmitted," the multipass driver 21 applies prediction data to a free space of the IO packet of the communication data (step S35), and sets a prediction data transmission state to be "transmitted" (step S36). The multipass driver 21 accesses the storage device 3 using the selected access path (step S37).

The storage device 3 receives communication data from the servers 2 (step S41), and the prediction data receiving unit 311 determines whether prediction data has been applied to the free space of the IO packet of the communication data (step S42). If prediction data has been applied to the free space of the IO packet of the communication data, another thread extracts only the prediction data (step S43), and stores the prediction data in the prediction data storage unit 312 (step S44).

If no prediction data has been applied to the free space of the IO packet of the communication data, or after another thread extracts only the prediction data, the storage device 3 performs processing with respect to the communication data (step S45). That is, the storage device 3 performs an IO receiving process, a data transfer process, an IO respond process, and so forth.

In this manner, since the multipass driver 21 applies prediction data to the communication data and transmits the data to the storage device 3, the storage device 3 can acquire prediction data.

Figure 11:
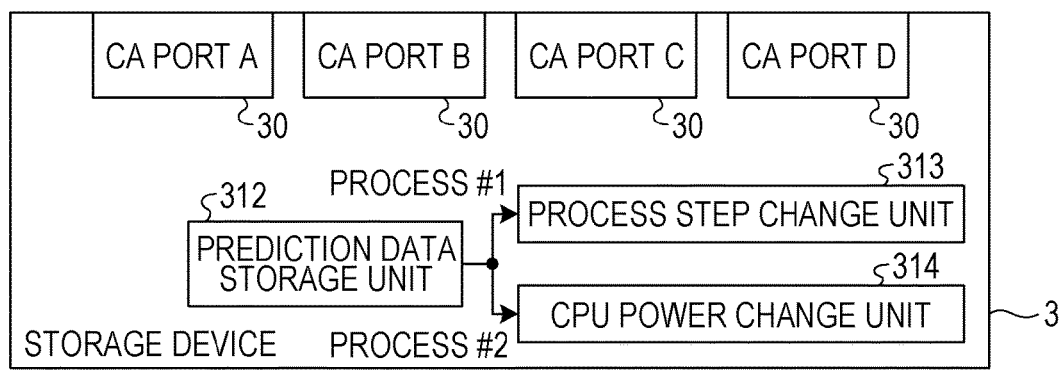
FIG. 11 illustrates a flow of a process to change setting on an IO process of a CA port.
Figure 12:
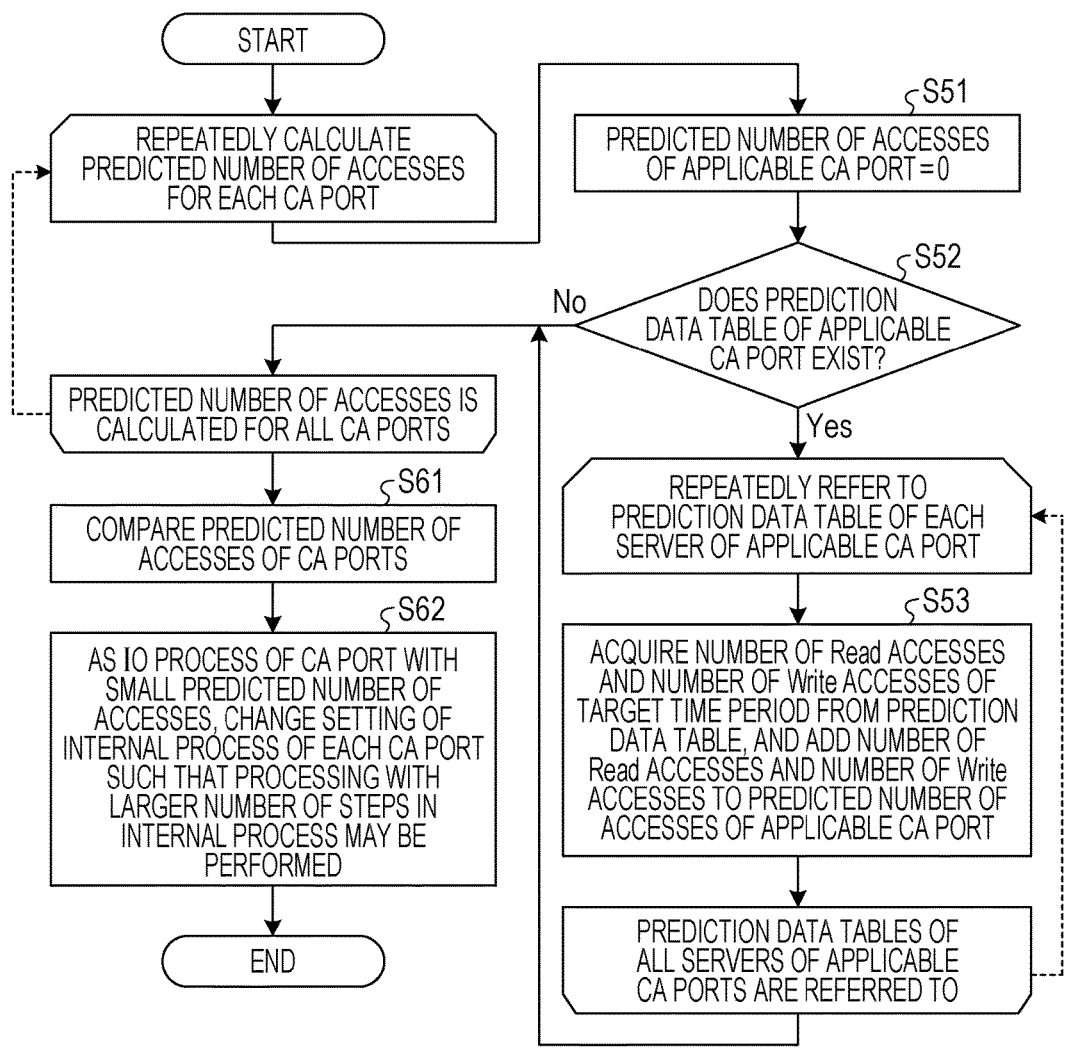
FIG. 12 is a flowchart illustrating a flow of a process to change setting of an internal process.
Figure 13:
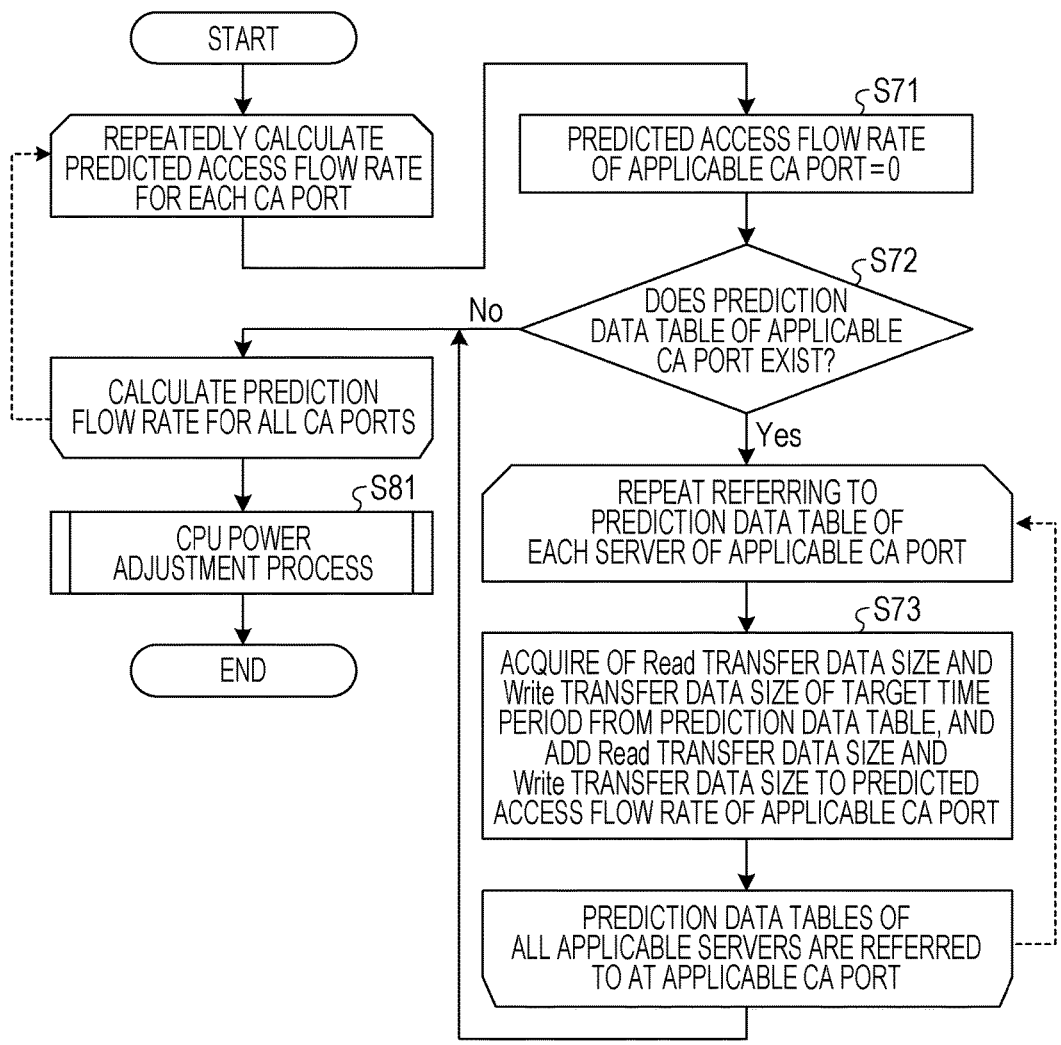
FIG. 13 is a flowchart illustrating a flow of a process to change setting of CPU power allocation.

Next, a process flow to change setting on the IO process of the CA port 30 will be described. FIG. 11 illustrates a flow of a process to change setting on an IO process of a CA port 30. FIG. 12 is a flowchart illustrating a flow of a process to change setting of an internal process. FIG. 13 is a flowchart illustrating a flow of a process to change setting of CPU power allocation. The process to change the setting on the IO process of the CA port 30 is performed at a certain time interval, such as hourly.

As illustrated in FIG. 11, the process step change unit 313 refers to the prediction data storage unit 312, and compares the number of predicted accesses to each CA port 30. The process step change unit 313 then changes setting of the internal process of the CA port 30 such that a process with a greater number of internal steps in the IO process of the CA port 30 with a smaller number of predicted accesses may be performed (process #1).

The CPU power change unit 314 refers to the prediction data storage unit 312, and compares the predicted access flow rate to each CA port 30. The CPU power change unit 314 allocates the CPU power in accordance with the predicted access flow rate to each CA port 30 (process #2).

Then, an IO request waiting thread registers the IO access request from each server 2 in an IO waiting cue for each CA port 30. Further, an IO request cue processing thread extracts and processes the IO access request from the IO waiting cue for each CA port 30 based on the CPU power allocated to each CA port 30.

As illustrated in FIG. 12, the process step change unit 313 performs a process to specify one CA port 30 and causes another predicted number calculation thread to calculate the predicted number of accesses about all the CA ports 30.

The predicted number calculation thread initializes the predicted number of accesses of the applicable CA port 30 to 0 (step S51). Then the predicted number calculation thread determines whether the prediction data table of the applicable CA port 30 exists (step S52), and if no prediction data table exists, terminates the process.

If the prediction data table exists, the prediction number calculation thread acquires the number of Read accesses and the number of Write accesses of a target time period from the prediction data table, and adds the number of Read accesses and the number of Write accesses to the number of predicted accesses of the applicable CA port 30 (step S53). The prediction number calculation thread performs the process of step S53 to the prediction data tables of all the servers 2.

Then the process step change unit 313 compares the number of predicted accesses of each CA port 30 (step S61). The process step change unit 313 then changes setting of the internal process of each CA port 30 such that a process with a greater number of steps in the internal process may be performed as the IO process of the CA port 30 with a smaller number of predicted accesses (step S62).

Thus, since the process step change unit 313 changes setting of the internal process based on the number of predicted accesses, the storage device 3 can equalize the performance of the IO access from the servers 2 among the CA ports 30.

As illustrated in FIG. 13, the CPU power change unit 314 performs a process to specify one CA port 30 and to calculate the predicted access flow rate in another prediction flow rate calculation thread about all the CA ports 30.

The prediction flow rate calculation thread initializes the predicted access flow rate of the applicable CA port 30 to 0 (step S71). Then the prediction flow rate calculation thread determines whether the prediction data table of the applicable CA port 30 exists (step S72), and if no prediction data table exists, terminates the process.

If the prediction data table exists, the prediction flow rate calculation thread acquires a Read transfer data size and a Write transfer data size in a target time period from prediction data table, and adds the Read transfer data size and the Write transfer data size to the predicted access flow rate of the applicable CA port 30 (step S73). The prediction flow rate calculation thread performs the process of step S73 to the prediction data table of all the servers 2.

The CPU power change unit 314 performs CPU power adjustment processing to change setting of CPU power allocation to each CA port 30 in accordance with the predicted access flow rate (step S81).

Figure 14:
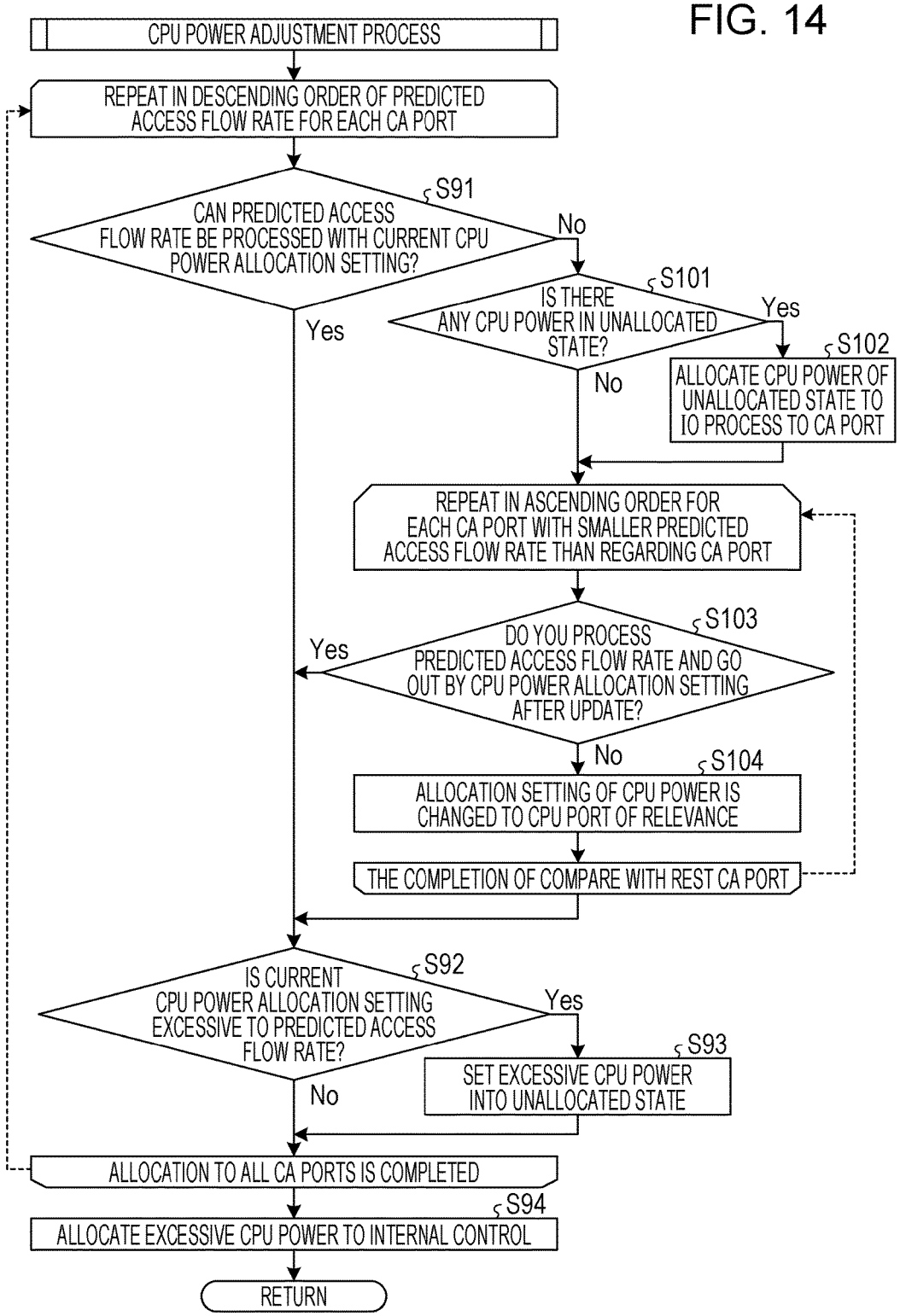
FIG. 14 is a flowchart illustrating a flow of a CPU power adjustment process.

FIG. 14 is a flowchart illustrating a flow of a CPU power adjustment process. As illustrated in FIG. 14, the CPU power change unit 314 performs processes of steps S91 to S93 in a descending order of the predicted access flow rate for each CA port 30.

That is, the CPU power change unit 314 determines whether it can process the entire predicted access flow rate with the current CPU power allocation setting (step S91). If the CPU power change unit 314 can process the entire predicted access flow rate, the CPU power change unit 314 determines whether the current CPU power allocation setting is excessive with respect to the predicted access flow rate (step S92).

If it is determined that the current CPU power allocation setting is excessive with respect to the predicted access flow rate, the CPU power change unit 314 changes the excessive CPU power to be an unallocated state (step S93). Then the CPU power change unit 314 returns to step S91, and processes the CA port 30 with a next higher predicted access flow rate.

When the process to all the CA ports 30 are terminated, the CPU power change unit 314 allocates excessive CPU power to the internal control (step S94).

If the predicted access flow rate is not able to be processed with the current CPU power allocation setting in step S91, the CPU power change unit 314 performs the processes of steps S101 to S104 in another excessive collection thread, and then proceeds to step S92.

The excessive collection thread determines whether CPU power in an unallocated state exists (step S101) and, if CPU power in an unallocated state exists, the excessive collection thread allocates the CPU power in an unallocated state to process an IO process of applicable CA port 30 (step S102).

The excessive collection thread performs the processes of steps S103 and S104 in an ascending order for each CA port 30 in which the predicted access flow rate is smaller than that of the applicable CA port 30 selected in a descending order. That is, the excessive collection thread determines whether it can process the entire predicted access flow rate with the updated CPU power allocation setting (step 103). If the excessive collection thread can process all of the predicted access flow rate, it terminates the process. The control then proceeds to step S92.

If the predicted access flow rate is not able to be processed with the updated CPU power allocation setting, the excessive collection thread switches allocation setting of the CPU power of the CA port 30 selected in an ascending order to a CA port 30 of the applicable (step S104). The excessive collection thread then returns to step S103.

When the excessive collection thread terminates processes about all the CA ports 30 with lower predicted access flow rates than that of the applicable CA port 30, the control proceeds to step S92.

Figure 15:
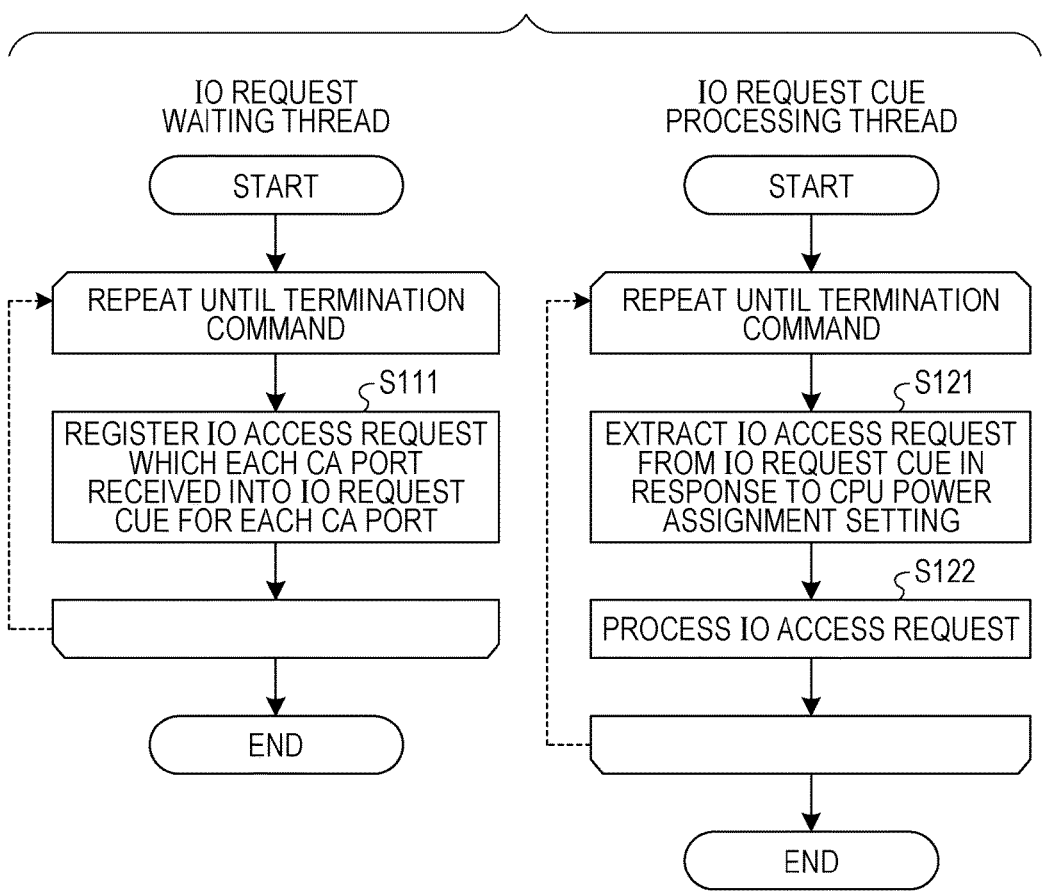
FIG. 15 is a flowchart illustrating a process flow of an IO request waiting thread and an IO request cue processing thread.

FIG. 15 is a flowchart illustrating a process flow of an IO request waiting thread and an IO request cue processing thread. As illustrated in FIG. 15, the IO request waiting thread repeats registering an IO access request received by each CA port 30 in an IO request cue for each CA port 30 until a termination command is issued (step S111).

The IO request cue processing thread repeats extracting an IO access request from the IO request cue for each CA port 30 in accordance with CPU power allocation setting until a termination command is issued (step S121), and processing the extracted IO access request (step S122).

Therefore, since the CPU power change unit 314 changes setting of the CPU power allocation based on the predicted access flow rate, the storage device 3 can equalize the performance of the IO access from the servers 2 among the CA ports 30.

Figure 16:
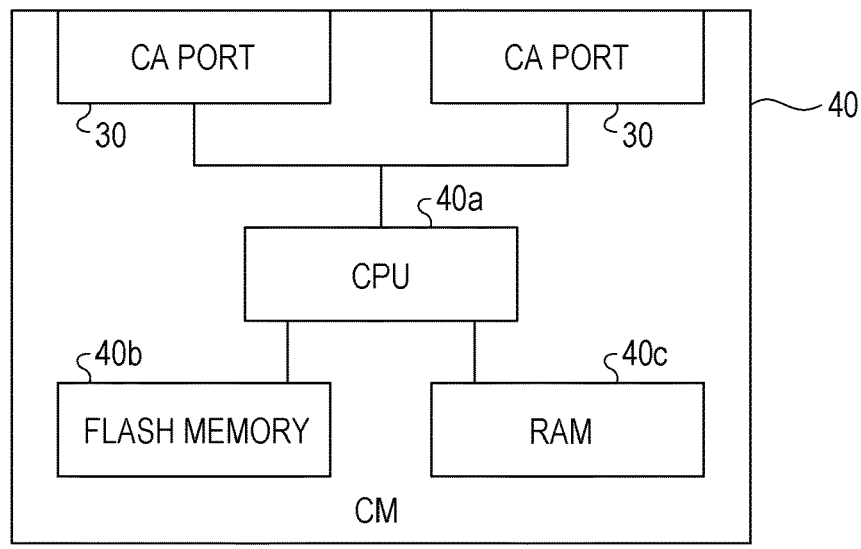
FIG. 16 illustrates a hardware configuration of a CM including a CPU which executes an equalization program according to an embodiment.

The function of the equalization unit 31 is implemented by causing the CPU to execute an equalization program having the same function included in the CM. Then, a hardware configuration of the CM which includes the CPU that executes the equalization program will be described. FIG. 16 illustrates a hardware configuration of a CM including a CPU which executes an equalization program according to an embodiment.

As illustrated in FIG. 16, a CM 40 includes two CA ports 30, a CPU 40a, flash memory 40b, and RAM 40c. The CPU 40a is a processor which loads and executes the equalization program stored in the RAM 40c.

The flash memory 40b is non-transitory memory which stores the equalization program. The RAM 40c is volatile memory which stores an equalization program read from the flash memory 40b. The RAM 40c stores data desired for executing the equalization program, a halfway result of execution of the equalization program, and so forth.

The function of the multipass driver 21 is implemented by the computer executing the multipass driver 21. Then, a hardware configuration of the computer which executes the multipass driver 21 will be described.

Figure 17:
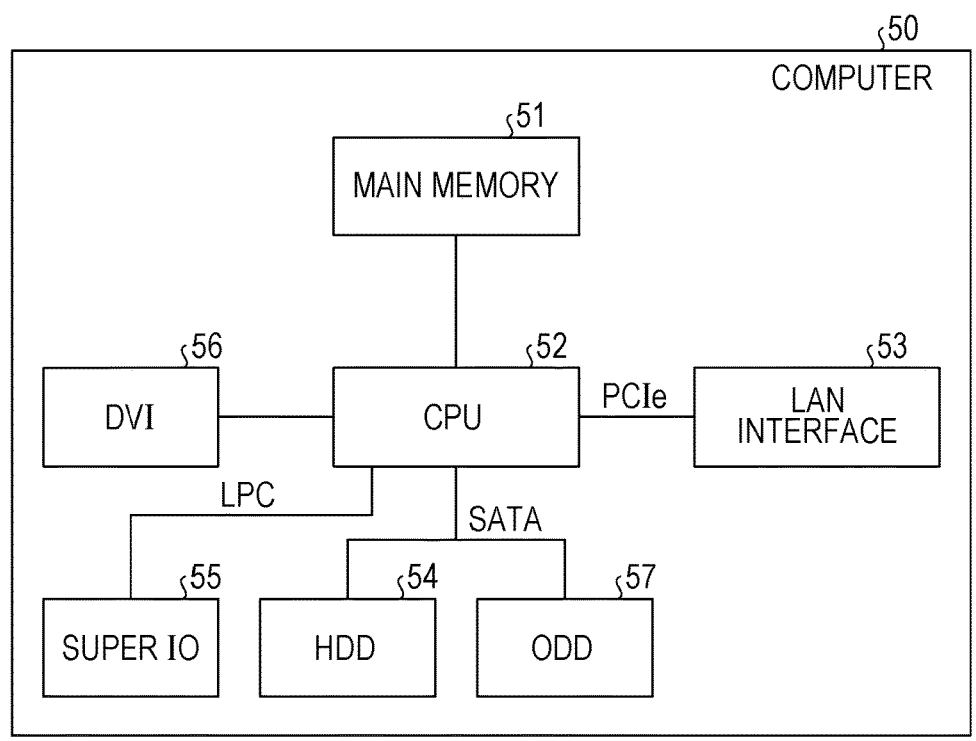
FIG. 17 illustrates a hardware configuration of a computer which performs a multipass driver according to an embodiment.

FIG. 17 illustrates a hardware configuration of a computer which performs the multipass driver 21 according to an embodiment. As illustrated in FIG. 17, a computer 50 includes main memory 51, a CPU 52, a local area network (LAN) interface 53, and a hard disk drive (HDD) 54. The computer 50 includes a super input/output (IO) 55, a digital visual interface (DVI) 56 and an optical disk drive (ODD) 57.

The main memory 51 is memory which stores a program, a halfway result of execution of the program, and so forth. The CPU 52 is a central processing unit which loads and executes a program from the main memory 51. The CPU 52 includes a chip set which includes a memory controller.

The LAN interface 53 is an interface for connecting the computer 50 to other computers via the LAN. The HDD 54 is a disk device which stores a program and data, and the super IO 55 is an interface for connecting input devices, such as a mouse and a keyboard. The DVI 56 is an interface which connects a liquid crystal display device, and the ODD 57 is an apparatus for writing reading a DVD.

The LAN interface 53 is connected to the CPU 52 by the PCI express (PCIe), and the HDD 54 and the ODD 57 are connected to the CPU 52 by the serial advanced technology attachment (SATA). The super IO 55 is connected to the CPU 52 by a low pin count (LPC).

The multipass driver 21 executed in the computer 50 is stored in a DVD which is an example recording medium to be read by the computer, and is read from the DVD by the ODD 57 and installed in the computer 50. Alternatively, the multipass driver 21 is stored in a database and so forth of other computer systems connected via the LAN interface 53, read from these databases, and installed in the computer 50. The installed multipass driver 21 is stored in the HDD 54, read into the main memory 51, and is executed by the CPU 52.

As described above, in an embodiment, the statistics unit 213 of the multipass driver 21 statistically processes the access information and generates the flow rate data, the prediction data generation unit 215 predicts the future flow rate using the flow rate data, and generate prediction data. Then the prediction data transmission unit 217 applies prediction data to the communication data, and the IO relay unit 211 transmits communication data to which prediction data has been applied to the storage device 3.

The prediction data receiving unit 311 of the storage device 3 extracts prediction data from the communication data transmitted from the servers 2. The process step change unit 313 calculates the number of predicted accesses of each CA port 30 by using the prediction data transmitted from a plurality of servers 2, and changes the setting of the internal process of each CA port 30 based on the number of predicted accesses of each CA port 30. The CPU power change unit 314 calculates the predicted access flow rate of each CA port 30 using the prediction data transmitted from a plurality of servers 2, and changes the setting of CPU power allocated to each CA port 30 based on the predicted access flow rate of each CA port 30.

Therefore, the information processing system 1 can equalize the performance of access to the storage device 3 from a plurality of servers 2. Therefore, in the information processing system 1, a decrease in IO performance of a particular CA port 30 can be reduced, and retransmission of the IO access caused by access concentration to a particular CA port 30 can be reduced.

In an embodiment, the multipass driver 21 has been described, the embodiment is not limited to the same. The embodiment is applicable also to a single pass driver.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A storage device storing data and to be used by a plurality of information processors, the storage device comprising:
a memory; and
a processor coupled to the memory and configured to:
receive prediction data which each of the plurality of information processors has predicted and transmitted, the prediction data including data regarding a data flow rate of each interface port with each of the plurality of information processors;
calculate an access prediction value of each interface port based on the prediction data received from the plurality of information processors; and
change a setting of a process of each interface port based on the access prediction value.

2. The storage device according to claim 1, wherein the processor is further configured to calculate a number of predicted accesses of each interface port based on the prediction data received from the plurality of information processors and change a setting as to whether the process of each interface port is set to a process with a greater number of steps or a process with a smaller number of steps based on the number of predicted accesses.

3. The storage device according to claim 1, wherein the processor is further configured to calculate the predicted access flow rate of each interface port based on the prediction data which the processor receives from the plurality of information processors and change a setting of a ratio at which a central processing unit is to be allocated to each interface port based on the predicted access flow rate.

4. The storage device according to claim 2, wherein
the storage device includes two controllers configured to control the storage device,
each of the two controllers includes an interface port, and one of the two controllers controls a storage unit which stores data, and
the processor changes a setting as to whether the process of each interface port is set to a process with a greater number of steps or a process with a smaller number of steps by changing a responsive controller into the other of the two controllers.

5. An information processor, comprising:
a memory; and
a processor coupled to the memory and configured to:
collect data regarding reading and writing as flow rate data for each interface port of a data storage device,
predict an amount of data regarding reading and writing for each interface port based on the flow rate data;
generate prediction data;
transmit the prediction data to the data storage device which collects the prediction data from a plurality of information processors; and
change a setting of a process of each interface port.

6. A non-transitory, computer-readable recording medium having stored therein a program for causing a computer to execute a process comprising:
collecting data regarding reading and writing as flow rate data for each interface port of a data storage device;
predicting an amount of data regarding reading and writing for each interface port based on the flow rate data;
generating prediction data; and
transmitting the prediction data to the data storage device which collects the prediction data from a plurality of information processors; and changing a setting of a process of each interface port.

7. A storage device comprising:
a memory storing instructions;
a processor coupled to the memory and configured to execute the instructions causing a process of:
predicting a number of accesses, by a plurality of servers, of a plurality of channel ports of the storage device;
determining whether a prediction data table exists for the channel port and, when a determination is made that the prediction data table exists;
acquiring a number of read accesses and a number of write accesses of a target time period from the prediction data table;

adding the number of read accesses and the number of write accesses to the number of accesses in the prediction data table;

comparing the number of accesses of each of the plurality of channel ports; and changing a setting of a process of each of the plurality of channel ports.

8. The storage device of claim 7, wherein the changing changes the process such that channel ports with a lower number of accesses execute an Input/Output (IO) process with a higher number of steps.

9. The storage device of claim 7, wherein the process further comprises predicting an access flow rate of the plurality of channel ports.

10. The storage device of claim 9, wherein the process further comprises acquiring a read transfer data size and a write transfer data size in the target time period from the data prediction table.

11. The storage device of claim 10, wherein the process further comprises adding the read transfer size and the write transfer size to the access flow rate of a channel port.

12. The storage device of claim 11, wherein the process further comprises adjusting a power allocation of each of the plurality of channel ports based on the adding.

13. The storage device of claim 9, wherein the process further comprises determining whether the process may be executed with the access flow rate based on electrical power indicated in a power allocation setting.

14. The storage device of claim 13, wherein the process further comprises determining whether the electrical power exceeds power necessary for executing the process.

15. The storage device of claim 14, wherein the process further comprises setting the electrical power to an unallocated state.

* * * * *